United States Patent [19]

Hornsby

[11] 4,112,581
[45] Sep. 12, 1978

[54] MICROMETER JIG

[76] Inventor: Isaac W. Hornsby, 2706 Anza, Bakersfield, Calif. 93305

[21] Appl. No.: 809,386

[22] Filed: Jun. 23, 1977

[51] Int. Cl.² ............................................. G01B 5/00
[52] U.S. Cl. ............................... 33/174 R; 33/147 J; 33/160
[58] Field of Search ............. 33/143 R, 143 H, 147 R, 33/147 E, 147 G, 147 T, 147 J, 148 R, 148 E, 148 F, 149 R, 153 R, 153 B, 154 R, 154 B, 154 E, 159, 160, 174 R, 174 E

[56] References Cited

U.S. PATENT DOCUMENTS

| 412,984 | 10/1889 | Schmidt | 33/174 R |
|---|---|---|---|
| 997,989 | 7/1911 | Glickert | 33/174 E |
| 2,207,480 | 7/1940 | Delgado | 33/174 E |

FOREIGN PATENT DOCUMENTS

| 336,963 | 3/1904 | France | 33/174 R |
|---|---|---|---|
| 1,038,469 | 5/1953 | France | 33/174 R |
| 60,567 | 5/1912 | Switzerland | 33/143 I |

OTHER PUBLICATIONS

Blumstein, M. L., "Dial Gauge Mounted on Square", *Popular Science Monthly*, 8-1933, p. 60.

*Primary Examiner*—Richard R. Stearns
*Attorney, Agent, or Firm*—Vergil L. Gerard

[57] ABSTRACT

Disclosed is a micrometer jig for measuring distances to close tolerances between a surface and a curved edge. The jig consists of a leg member with a socket at one end which slidably mounts an arm member in "T" relationship to the leg. A protractor housing is slidably mounted on the leg and pivotally mounts a protractor finger which projects from one side of the leg. A threaded stub shaft projects from the tail of the rotractor finger and carries a wing nut to releasably secure the finger in a particular angular disposition with respect to the leg member. The arm member carries a micrometer on the end adjacent the protractor finger so that accurate measurement can be achieved between a surface contacted by the micrometer and the apex of the angle formed by the leg member and protractor finger.

12 Claims, 20 Drawing Figures

MICROMETER JIG

BACKGROUND OF INVENTION

This invention relates generally to measuring devices for close tolerance machine work and particularly to jigs for micrometers.

In close tolerance machine work, the micrometer, either dial type or barrel type, is a necessary tool of measurement. However, in order to effectively utilize the micrometer in many measurement conditions, jigs are required to mount the micrometer to the measurement problem. The micrometer will provide accurate measurements only if the dimension to be measured can be accurately presented to it.

Callipers are a common device used to present a dimension to a micrometer where the micrometer cannot otherwise be conveniently presented to the work. However, in measuring outside dimensions of a non-rectangular piece such as trapezoidal pieces or other objects of irregular shape, particularly where the corners formed by the junctions of lines or planes have a radius, callipers, either inside or outside are not suitable present the dimension to be checked to the micrometer. A need therefore exists for a micrometer jig which will readily permit micrometer measurement of such shapes.

It is therefore a major object of my invention to provide a micrometer jig which readily permits measurement by a micrometer of multisided irregular shaped objects.

It is also an important object of my invention to provide a micrometer jig of the type described in which one work engaging surface of the jig is angularly adjustable.

It is another object of my invention to provide a micrometer jig of the type described in which either a barrel type or dial type micrometer can be used and quickly adjusted to a standard pattern, and which provides a deep throated micrometer callipers as well as protractor callipers.

It is a further object of my invention to provide a micrometer jig of the type described which is relatively inexpensive to manufacture and yet is sufficiently rugged in construction to maintain a high fidelity of measurement.

These and other objects and advantages of my invention will be more readily apparent from the following detailed description of a preferred embodiment when read together with the accompanying drawings in which.

Figure 2:
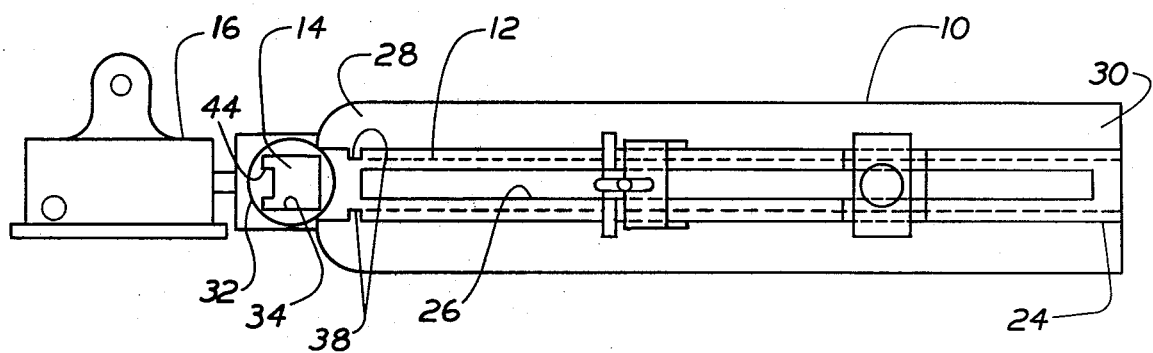
FIG. 2 is an end elevational view of the preferred embodiment of FIG. 1.
Figure 1:
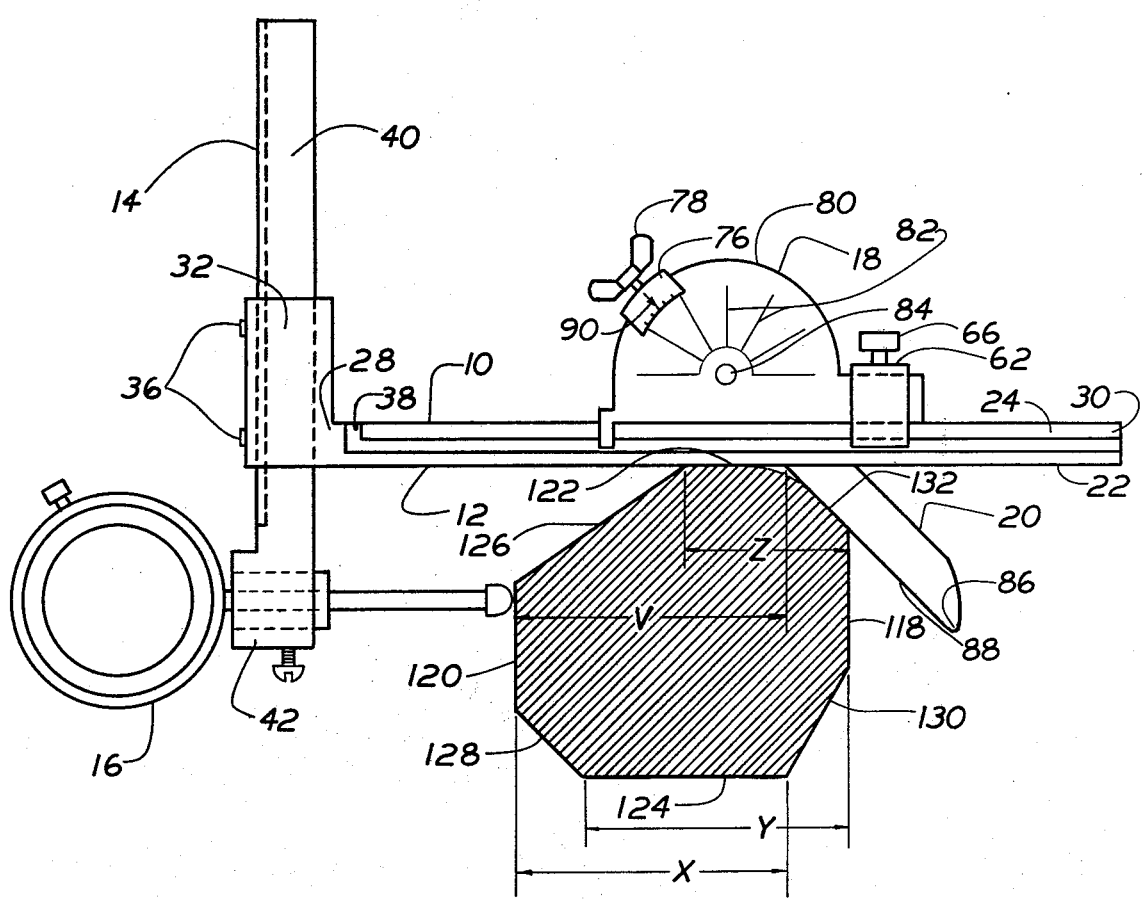
FIG. 1 is a side elevational view of the micrometer jig constituting a preferred embodiment of my invention.
Figure 3:
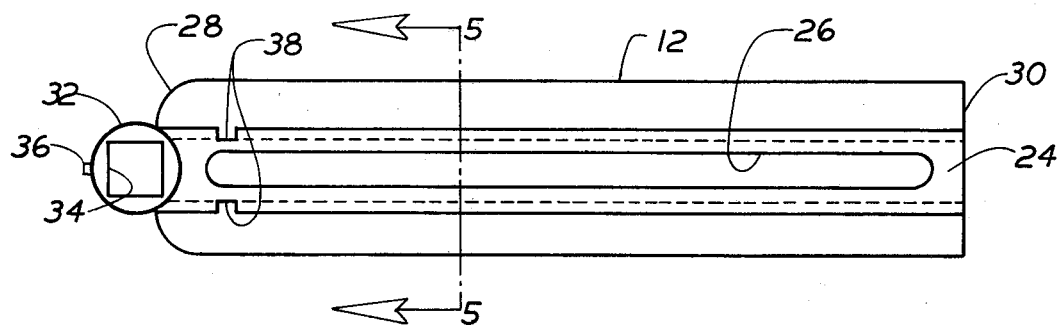
FIG. 3 is an end view of the leg member of my micrometer jig.
Figure 5:
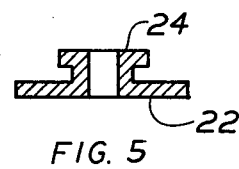
FIG. 5 is a sectional view taken at 5—5 in FIG. 3.
Figure 4:
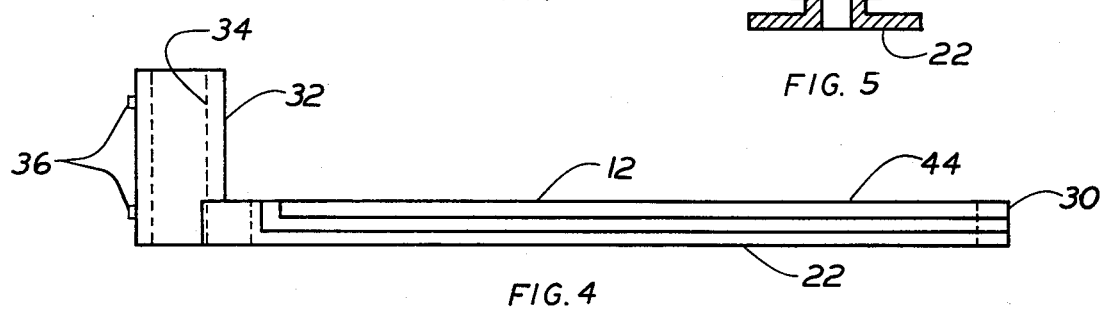
FIG. 4 is a side elevational view of the leg member of FIG. 3.
Figure 6:
FIG. 6 is a plan view of the arm member of my micrometer jig.
Figure 7:
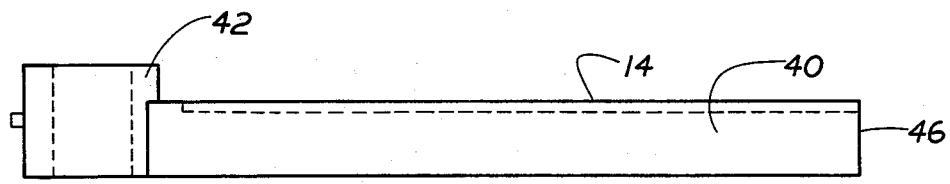
FIG. 7 is a side elevational view of the arm member shown in FIG. 6.
Figure 8:
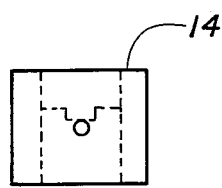
FIG. 8 is a front end view of the arm member of FIG. 6.
Figure 9:
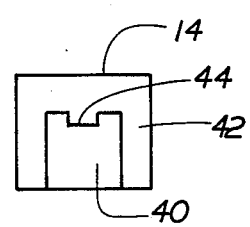
FIG. 9 is a rear end view of the arm member of FIG. 6.
Figure 10:
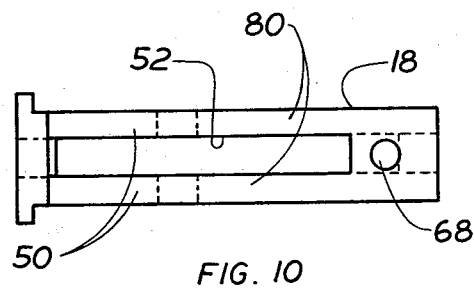
FIG. 10 is a plan view of the protractor block which slidably mounts upon the leg member in my preferred embodiment.
Figure 12:
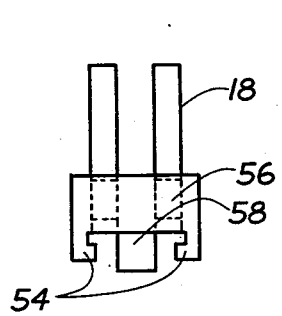
FIG. 12 is a front end view of the protractor block at FIG. 10.
Figure 11:
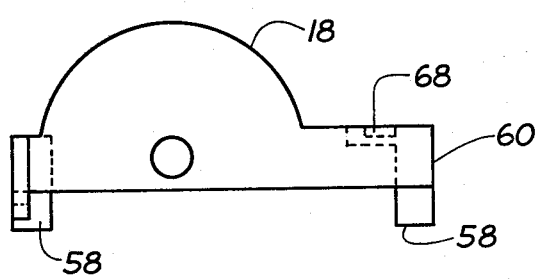
FIG. 11 is a side elevational view of the protractor block of FIG. 10.
Figure 13:
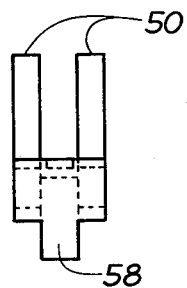
FIG. 13 is a rear end view of the protractor block of FIG. 10.
Figure 14:
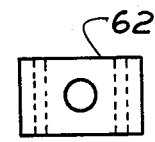
FIG. 14 is a plan view of the tail clamp which clamps the rear end of the protractor block shown in FIG. 10.
Figure 15:
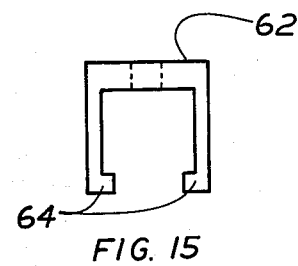
FIG. 15 is an end view of the tail clamp of FIG. 14.
Figure 16:
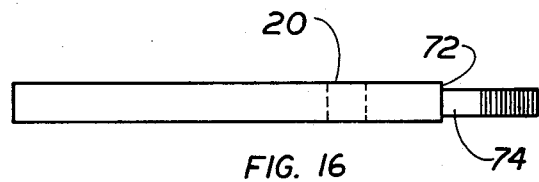
FIG. 16 is a plan view of the protractor finger of my preferred embodiment.
Figure 17:
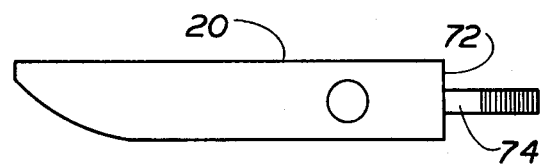
FIG. 17 is a side elevational view of the protractor finger shown in FIG. 16.

Referring now to the drawings, and particularly, to FIGS. 1 and 2 thereof: The numeral 10 represents generally my micrometer jig which consists of a leg member 12, and arm member 14 which mounts a dial indicator 16 and a protractor block 18 which mounts a protractor finger 20. As best shown in FIGS. 3–5, the leg member 12 has a work engaging surface 22 on the front with a flanged track 24 mounted on the back.

A slot 26 is formed through the leg member 12 and in longitudinal alignment therewith. The leg member 12 has a head end 28 and a tail end 30. At the head end 28, an arm member socket 32 is formed on the leg member 12 with a transverse square bore 34 and two lock screws 36. At the head end 28, a pair of notches 38 are provided in the track 24 to permit the insertion of cleats on the protractor block as will be later explained.

The arm member 14 as best shown in FIGS. 6–9, has an elongated shaft portion of 40 and a micrometer mounting block 42 at one end of the shaft portion. A groove 44 is provided in the shaft portion 40 in longitudinal alignment therewith, the groove 44 extends over nearly the entire distance of the shank portion and opens through the tail end 46 of the arm member. The groove 44 permits the arm member 14 to be slipped into the square bore 34 with the set screws 36 slightly penetrating the bore and provides a seat for the set screws 36 when they are tightened down to hold the arm member 14 against sliding movement in the arm member socket 32.

The protractor block 18 as best shown in FIGS. 10–13 has a pair of ears 50 which are disposed and spaced parallel in relationship to provide a protractor finger slot 52. The protractor finger slot 52 is disposed to align with the leg member slot 26 when the protractor is mounted on the leg member track 24. To mount the protractor block 18 on the leg member track 24 a pair of track cleats 54 are mounted on the forward end 56 of the protractor block.

A pair of track guides 58 are mounted on the front and rear portions of the protractor block 18 and project down into the leg member slot 24. The protractor block 18 is mounted on the track 24 of the leg member 12 by passing the cleats 54 on the forward end of the protractor block through the notches 38 at the forward end of the track and then moving the protractor block backward along the track so that the cleats are positioned between the protruding top edge of the track. To hold the rear end 60 of the protractor block to the track, a tail clamp 62 is provided. The tail clamp has cleats 64 on its lower portion which slide over the track from the tail end of the leg member and a set screw 66 which threads through the top portion of the tail clamp into a recess 68 in the tail portion of the protractor block. When clamped down the screw clamp holds the protractor block against movement on the track of the leg member. When released the protractor block is moveable longitudinally on the leg member.

The protractor finger 20 is mounted in the protractor block by insertion of a tail end 72 of the finger into the slot 24 in the leg member and through the slot 52 in the protractor which aligns with the leg member slot. At the tail end of the finger is a threaded stud 74 which projects through the protractor slot 52 and beyond the ears 50. A slide 76 is mounted on the stud outside of the ears 50 and held thereon with a wing nut 78.

The upper surfaces 80 of the ears 50 are cylindrical so that the slide 76 passes uniformly over the ears from one end to another. Indicia 82 are placed on the edges of the ears to indicate the angle at which the protractor finger is projecting from the protractor block. The protractor finger 20 is pinned in the block to give it pivotal movement in the block by pin 84. The forward or distal end 86 of the finger projects from the block 18 and through the slot 24 of the leg member to provide a work contact surface 88 used in the measuring function of the jig. When the distal end 86 of the finger projects exactly at 90 degrees from the work engaging surface 22 of the leg member, the indicia on the protractor block will indicate that position in relationship to a marker 90 formed on the slide 76. The protractor may then be secured in that position by tightening down on the wing nut 78 on the tail stud 74. If an angle of 45 degrees is desired, the wing nut 78 on the tail stud 74 is loosened and the distal end 86 of the protractor finger 20 is moved to an angle of exactly 45 degrees to the work engaging surface 22 of the leg member. This position will be indicated by the marker 90 on the slide 76 pointing to a 45 degree indicator on the indicia 82 on the sides of the protractor ears 50.

Figure 18:
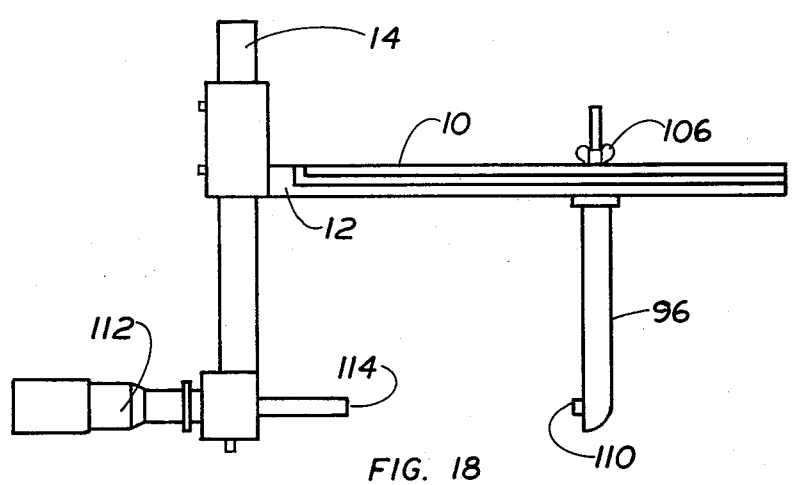
FIG. 18 is a side elevational view of an alternative form of my invention with a different protractor finger.
Figure 19:
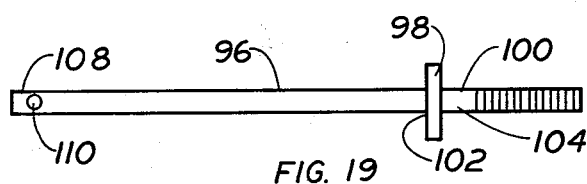
FIG. 19 is a plan view of the protractor finger of FIG. 18.
Figure 20:
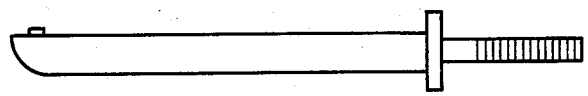
FIG. 20 is a side elevational view of the protractor finger of FIG. 18.

An alternative use of my micrometer jig is shown in FIGS. 18-20. In this use the protractor block 18 and finger 20 are removed from the leg member 12 and a longer calliper finger 96 is inserted in the slot 24 of the leg member. The longer calliper finger 96 has a shoulder 98 at its tail end 100 which has a right angle contact surface 102 that mates with the work engaging surface 22 on the leg member, and a tail stud 104 which projects through the slot 22 in the leg member and is secured to the leg member by a wing nut 106. At the distal end 108 of the calliper finger 96 is a contact pad 110 with a smooth surface for contacting work to be measured by the jig.

In the arm member 14 I mount a barrel type micrometer 112 in place of the dial indicator 16 with the micrometer contact point 114 projecting down and in axial alignment with the contact pad 110 on the calliper finger. By this arrangement I provide a deep throated measuring device for measurement of surfaces which are beyond the reach of the usual C-shaped micrometer jig.

Although some barrel micrometers have different cylindrical mounting sizes than the mounting sizes of certain dial type micrometers, this can be adjusted to fit into the mounting socket in my arm member 14 by means of adapter sleeves. Even greater variation in use can be achieved with my micrometer jig by having a set of calliper arms 96 of different lengths. Also, my micrometer jig can be used to measure the wall thickness of a pipe by placing over the contact pad 110 on the end of the calliper finger a half-cylinder cap. This provides a circular contact point for accurate measurement of a cylindrical wall thickness. A similar ball cap is mounted on the micrometer leg itself.

OPERATION

Having described the various parts and structure of my micrometer jig, I will now describe its operation.

The operation of my micrometer jig can best be illustrated by the measurement problems presented by a piece of work illustrated in FIG. 1. The work shown is a cross section of an annulus about 18 inches in inside diameter. The inside diameter is represented by surface 118 which is accurately cut in the forming of the annulus. The outside diameter is represented by a surface 120 and this is also accurately cut in the forming of the annulus. Two face surfaces are also cut in the forming of the annulus. These are represented by numerals 122 and 124. These face surfaces are cut to their widest tolerance respecting the spacing between them so that further minor cuts may be made on the surfaces and the required tolerances still maintained. Beveled surfaces must then be formed on the annulus at surfaces 126, 128, 130 and 132.

The angles of these surfaces are indicated by the job specifications, however, their junction with the face surfaces and the inside and outside diameter surfaces of the annulus must be accurately located. In some cases, these junctions are specified to have a radius. The measurement problem is therefore the problem of measuring the dimension for the surface 132, the dimension for the surface 130, the dimension for surface 128 and the dimension for surface 132. As the drawing indicates, each of these surfaces is measured with respect to either the inside diameter or the outside diameter which are accurately known. Since the junction of the planes is determined by the machining on the surfaces themselves, and must be formed to close tolerances, a simple and effective means are needed to permit these dimensions to be measured with a micrometer. This requires a means for accurately determining the point of the junction of the planes which form the corner to which you are measuring.

As best shown in FIG. 2 this is achieved by first placing my micrometer jig on a standard with the specified angle of the surface 128 set on the protractor finger 20, and with th leg of the micrometer positioned on the outside diameter surface 120. This, of course, is achieved by moving the arm member 14 with respect to the leg member 12 while the leg members work engaging surface 22 is placed against the work. Also, to keep the micrometer in a desired scale position, the protractor block 18 can be moved longitudinally along the leg member 12 to place the protractor finger 20 at the desired position on the angular surface. The protractor block 18 is then secured by tightening down on the set screw 66 of the tail clamp 62 and the protractor finger is secured by tightening down on the wing nut 78 on the finger tail stud 74. The arm member 14 is secured in its relationship to the leg member by setting up the set screws 36 in the arm member housing 34.

With the micrometer jig in this condition, the dial on the dial indicator 16 is set to zero so that the standard measurement is inserted. Then, the micrometer is ready to measure a work piece.

To measure the work piece, the micrometer jig is removed from the standard and set in proper position on the work piece with the protractor finger 20 engaging the surface 132, one of the planes forming the junction to which the measurement is directed, and the work engaging surface 22 of the leg member pressed against the other surface 122 thereby defining between the protractor finger 20 and the leg member work engaging surface 22 the apex or junction of said surfaces. The micrometer is then placed on the outside diameter surface 120 of the piece to be measured and the dial is read. If the dial reads zero then the piece has been accurately formed. If it reads a certain number from zero in one direction or the other, the correction must be made.

To make the correction, or course, the appropriate surface of the two planes forming the junction must be further cut. In most cases this will be the bevel surface, since the machining of the bevel surface is done in a way to hold extra tolerance for cutting on that surface and to move toward an accurate finish point. Nevertheless, if the cutting needs to be done on one of the face surfaces because a beveled surface has been overcut, this may be done also, since the face surface has been held to the outer limit of its tolerance and certain further cutting is permissible without overcutting the tolerance limits.

To measure one of the other dimensions, such as X, Y or Z, the same approach is followed. That is, first the finger 20 is set to the appropriate angle for the beveled surface to be measured and then placed against the standard to zero the micrometer. After the micrometer jig and micrometer are set to the standard, they are applied to the work piece and the same determination is made as to the accuracy of the work piece with further work being done as necessary.

This detailed explanation of the structure and operation of my micrometer jig, it will be understood that I have provided a very effective tool for making the difficult measurement between the junction of two planes and a known surface. More, over, it will be understood that my tool has the versatility to make normal measurements as deep-throated micrometer callipers.

It will therefore be understood that my micrometer jig is filly capable of attaining the objects and providing the advantages heretofore attributed to it.

I claim:

1. A measurement jig comprising:
    a leg member with a longitudinally disposed work engaging surface thereon and means for mounting an arm at one end thereof in a generally T-shaped relationship; protractor means movably mounted on said leg member for reciprocalmovement with respect thereto, and having finger mounting means for adjustably pivotally mounting a work engaging finger disposed angularly with respect to the said work engaging surface;
    a work engaging finger mounted in said finger mounting means for angular projection therefrom; said work engaging finger having a work engaging surface on the distal portion thereof; and
    a measurement indicator mounting arm having a measurement indicator mounting socket disposed to mount a measurement indicator, and having shank means movably mounted by said arm mounting means at said end of said leg member for adjustable reciprocal movement to position said measurement indicator mounting socket laterally with respect to the longitudinal axis of said leg member.

2. A measurement jig as described in claim 1, in which:
    said protractor means includes a pair of semi-circular ears in spaced parallel relationship slidably mounted on said leg member and disposed to pivotally mount said work engaging finger therebetween, and clamp means for securing said work engaging surface of said work engaging finger at a particular angle with respect to the work engaging surface of said leg member.

3. A measurement jig as described in claim 2, in which:
    said leg member includes a longitudinal track for slidably mounting said protractor means thereon and a longitudinal slot therethrough disposed to pass said work engaging finger therethrough when said finger is pivotally mounted in said protractor means, as aforesaid.

4. A measurement jig as described in claim 2, in which:
    said measurement indicator mounting socket of said measurement indicator mounting arm is disposed to mount a measurement indicator with its axis parallel to the axis of said leg member work engaging surface, and said shank means is disposed to position said measurement indicator socket on the same side of said leg member as said work engaging surface.

5. A measurement jig as described in claim 1, in which:
    said work engaging finger is pivotally mounted at its proximal end in said finger mounting means and
    said work engaging surface on said work engaging finger is disposable to form a predetermined obtuse angle with said work engaging surface of said leg member with its apex opening toward said measurement indicator mounting socket.

6. A measurement jig as described in claim 1, in which:
    said measurement indicator mounting socket is disposed to mount a measurement indicator with its work engaging surface directed toward work captured between said work engaging surface of said work engaging finger and said work engaging surface of said leg member.

7. A measurement jig as described in claim 1, in which:
    said leg member includes a longitudinally disposed track parallel to said work engaging surface, and a longitudinally disposed slot perpendicular to said work engaging surface and extending completely through said leg member from a side containing said work engaging surface to an opposite side having said longitudinal track;
    said protractor means includes a body member having track cleats disposed to engage said leg member track for reciprocal movement thereon, and having a slot therethrough disposed in alignment with said leg member slot when said body member is mounted on said leg member track as aforesaid; and
    releasable clamp means operatively associated with said protractor means body member and said leg member and disposed to releasably clamp said body member to said leg member in a particular position.

8. A measurement jig as described in claim 7, in which:
said body member of said protractor means includes a pair of arcuate spaced parallel surfaces, one on each side of said body member slot, and a tail portion on the proximal end of said finger having releasable finger clamp means operable to secure said finger with its work engaging surface disposed at a particular angular position with respect to said work engaging surface of said leg member.

9. A measurement jig comprising:
a frame having a planar work engaging surface;
a measurement indicator mounting means interconnected with said frame disposed to mount a measurement indicator with its axis parallel to, but laterally offset from, said frame work engaging surface; and
a movable member interconnected with said frame and having an elongated planar movable member work engaging surface forming a variable angle with said frame work engaging surface with its apex directed toward said measurement indicator work engaging surface.

10. A measurement jig as described in claim 9, in which:
said measurement indicator mounting means includes a shank slidably mounted in a socket in one end of said frame and a bore disposed to receive the barrel of a screw type measurement indicator.

11. A measurement jig as described in claim 9, in which:
said movable member includes a slide member slidably mounted on said frame which pivotally mounts said movable member thereto with said movable member work engaging surface projecting therefrom on the same side of said frame as said frame work engaging surface.

12. A measurement jig as described in claim 9, in which:
said slide member has angle designation means disposed to indicate the angle between said work engaging surface of said frame and the work engaging surface of said movable member; and
lock means for releasably securing said movable member with its work engaging surface at a particular angle with respect to the work engaging surface of said frame.

* * * * *